(12) United States Patent
Lindquist et al.

(10) Patent No.: US 6,737,784 B2
(45) Date of Patent: May 18, 2004

(54) LAMINATED AMORPHOUS METAL COMPONENT FOR AN ELECTRIC MACHINE

(76) Inventors: Scott M. Lindquist, 4700 Touhey Dr. #105, Myrtle Beach, SC (US) 29579; Gordon E. Fish, 103 Lorraine Avenue, Montclair, NJ (US) 07043; Nicholas J. DeCristofaro, 33 Lincoln Ave., Chatham, NJ (US) 07928; Peter J. Stamatis, 107 Washington Ave., Morristown, NJ (US) 07960

( * ) Notice: Subject to any disclaimer, the term of this patent is extended or adjusted under 35 U.S.C. 154(b) by 97 days.

(21) Appl. No.: 09/971,544

(22) Filed: Oct. 5, 2001

(65) Prior Publication Data

US 2002/0158540 A1 Oct. 31, 2002

Related U.S. Application Data

(60) Provisional application No. 60/240,783, filed on Oct. 16, 2000.

(51) Int. Cl.[7] .................................................. H02K 1/00
(52) U.S. Cl. ........................ 310/216; 310/251; 310/254; 310/261
(58) Field of Search ................................ 310/216, 251, 310/254, 261

(56) References Cited

U.S. PATENT DOCUMENTS

| | | | |
|---|---|---|---|
| 4,201,837 A | 5/1980 | Lupinski | 428/457 |
| 4,211,944 A * | 7/1980 | Haller | 310/72 |
| 4,268,325 A | 5/1981 | O'Handley et al. | 148/108 |
| 4,343,347 A | 8/1982 | Liebermann et al. | 164/463 |
| 4,385,932 A | 5/1983 | Inomata et al. | 75/123 B |
| 4,403,401 A * | 9/1983 | Rosenberry | 29/596 |
| 4,716,556 A | 12/1987 | Raskin et al. | 367/168 |
| 4,763,030 A | 8/1988 | Clark et al. | 310/26 |
| 5,160,379 A | 11/1992 | Yoshizawa et al. | 148/108 |
| 5,208,503 A * | 5/1993 | Hisey | 310/259 |
| 5,252,877 A | 10/1993 | Sawa et al. | 310/214 |
| 5,258,681 A | 11/1993 | Hibino et al. | 310/214 |
| 5,270,595 A | 12/1993 | Wisner | 310/26 |
| 5,355,045 A * | 10/1994 | Hisey | 310/259 |
| 5,522,948 A | 6/1996 | Sawa et al. | 148/308 |
| 5,671,524 A | 9/1997 | Damsky et al. | 29/596 |
| 5,873,954 A | 2/1999 | Liebermann et al. | 148/304 |
| 5,935,347 A | 8/1999 | Suzuki et al. | 148/121 |
| 6,331,363 B1 * | 12/2001 | DeCristofaro et al. | 428/692 |
| 6,346,337 B1 * | 2/2002 | DeCristofaro et al. | 428/692 |
| 6,348,275 B1 * | 2/2002 | DeCristofaro et al. | 428/692 |
| 6,392,072 B1 * | 5/2002 | Henriksen | 554/141 |
| 6,462,456 B1 * | 10/2002 | DeCristofaro et al. | 310/216 |

FOREIGN PATENT DOCUMENTS

| | | | |
|---|---|---|---|
| EP | 0 058 269 A1 | 8/1982 | |
| EP | 0 430 085 A2 | 6/1991 | |
| WO | WO 96/00449 | 1/1996 | |
| WO | WO 9966624 A1 * | 12/1999 | H02K/1/14 |

* cited by examiner

Primary Examiner—Dang Le
Assistant Examiner—J. Aguirrechea
(74) Attorney, Agent, or Firm—Ernest D. Buff & Associates, LLC; Ernest D. Buff; Gordon E. Fish (57) ABSTRACT

A bulk amorphous metal magnetic component for an electric machine such as a motor or generator is described. The component may include a plurality of substantially similarly shaped laminations stamped from ferromagnetic amorphous metal strips, stacked and bonded together in registry, wherein the laminations include a plurality of tooth-shaped sections. In an alternate implementation, the component may be constructed by first stacking a plurality of layers of amorphous metal strips, laminating the layers and then cutting the object to form the component. The bulk amorphous metal magnetic component when operated at an excitation frequency "f" to a peak induction level $B_{max}$ has a core-loss less than "L" wherein L is given by the formula $L=0.0074\ f(B_{max})^{1.3}+0.000282\ f^{1.5}(B_{max})^{2.4}$, said core loss, said excitation frequency and said peak induction level being measured in watts per kilogram, hertz, and teslas, respectively.

10 Claims, 8 Drawing Sheets

LAMINATED AMORPHOUS METAL COMPONENT FOR AN ELECTRIC MACHINE

This application claims the benefit of U.S. provisional application No. 60/240,783, filed Oct. 16, 2000.

BACKGROUND OF THE INVENTION

1. Field of the Invention

This invention relates to a magnetic component for an electric machine such as a motor. In particular, an amorphous metal component such as a rotor or stator for a high efficiency radial-flux electric motor is described. The term "electric motor," as used herein, refers generically to a variety of rotating electrical machines which additionally may include electric generators as well as regenerative motors that may be operated optionally as electric generators.

2. Description of the Prior Art

A radial-flux design electric motor typically contains a generally cylindrical stator made from a plurality of stacked laminations of non-oriented electrical steel. Most commonly, each lamination has the annular shape of a circular washer along with "teeth" that form the poles of the stator. The teeth protrude from the inner diameter of the stacked laminations and point toward the center of the cylindrical stator. Each lamination is typically formed by stamping, punching or cutting mechanically soft, non-oriented electrical steel into the desired shape. The formed laminations are then stacked and bound to form a stator. During operation the stator is periodically magnetized with ensuing losses due to magnetic hysteresis, reducing the overall motor efficiency.

Although amorphous metals offer superior magnetic performance when compared to non-oriented electrical steels, they have long been considered unsuitable for use in electric motors due to certain physical properties and the corresponding fabricating limitations. For example, amorphous metals are thinner and harder than non-oriented steel. Consequently, conventional cutting and stamping processes cause fabrication tools and dies to wear more rapidly. The resulting increase in the tooling and manufacturing costs makes fabricating amorphous metal components such as rotors and stators using such techniques commercially impractical. The thinness of amorphous metals also translates into an increased number of laminations in the assembled component, further increasing its total cost.

Amorphous metal is typically supplied in a thin continuous ribbon having a uniform ribbon width. However, amorphous metal is a very hard material making it very difficult to cut or form easily, and once annealed to achieve peak magnetic properties, becomes very brittle. This makes it difficult and expensive to use conventional approaches to construct amorphous metal magnetic components. The brittleness of amorphous metal also causes concern for the durability of a motor or generator which utilizes amorphous metal magnetic components. Magnetic stators are subject to extremely high magnetic forces which change at very high frequencies. These magnetic forces are capable of placing considerable stresses on the stator material which may damage an amorphous metal magnetic stator. Rotors are further subjected to mechanical forces due both to normal rotation and to rotational acceleration when the machine is energized or de-energized and when the loading changes, perhaps abruptly.

Another problem with amorphous metal magnetic components is that the magnetic permeability of amorphous metal material is reduced when it is subjected to physical stresses. This reduced permeability may be considerable depending upon the intensity of the stresses on the amorphous metal material. As an amorphous metal magnetic stator is subjected to stresses, the efficiency at which the core directs or focuses magnetic flux is reduced resulting in higher magnetic losses, reduced efficiency, increased heat production, and reduced power. This phenomenon is referred to as magnetostriction and may be caused by stresses resulting from magnetic forces during the operation of the motor or generator, mechanical stresses resulting from mechanical clamping or otherwise fixing the magnetic stator in place, or internal stresses caused by the thermal expansion and/or expansion due to magnetic saturation of the amorphous metal material.

Non-conventional approaches to amorphous metal component designs have been proposed. In one approach, a "toothless" stator, consisting simply of a tape-wound amorphous metal toroid, has been suggested. While this approach is attractive for manufacture, the geometry is not favorable magnetically. The flux path results in excess eddy current losses and the large air gap between the stator and rotor limits the performance and control of the motor. A second approach attempts to replicate the conventional stator shape by combining a tape-wound amorphous metal toroid with stacks of cut amorphous metal. The wound amorphous metal toroid forms the back-iron of the stator and the cut amorphous metal stacks are mounted on the inner diameter of the toroid to form the teeth or poles. While this approach reduces the air gap between the stator and rotor, the magnetic flux must cross the many layers of tape wound back-iron as the flux passes from the tooth to the back-iron. This greatly increases the reluctance of the magnetic circuit and the electric current required to operate the motor.

A third approach, disclosed by U.S. Pat. No. 4,197,146 to Frischmann, fabricates the stator from molded and compacted amorphous metal flake. Although this method permits fabrication of complex stator shapes, the structure contains numerous air gaps between the discreet flake particles of amorphous metal. Such a structure greatly increases the reluctance of the magnetic circuit and the electric current required to operate the motor.

A fourth approach, taught by German Patents DE 28 05 435 and DE 28 05 438, divides the stator into wound pieces and pole pieces. A non-magnetic material is inserted into the joints between the wound pieces and pole pieces, increasing the gap, and thus increasing the reluctance of the magnetic circuit and the electric current required to operate the motor. The layers of material that comprise the pole pieces are oriented with their planes perpendicular to the planes of the layers in the wound back iron pieces. This configuration further increases the reluctance of the stator, because contiguous layers of the wound pieces and of the pole pieces meet only at points, not along full line segments, at the joints between their respective faces. In addition, this approach teaches that the laminations in the wound pieces are attached to one another by welding. The use of heat intensive processes, such as welding, to attach amorphous metal laminations will recrystallize the amorphous metal at and around the joint. Even small sections of recrystallized amorphous metal will increase the magnetic losses in the stator.

A fifth approach, disclosed by U.S. Pat. No. 4,255,684 to Mischler, involves fabricating the stator from either laminated strips of amorphous metal or from moldable composites of amorphous metal flake. Stator fabrication using laminated strips involves bending the strips to the desired stator shape. The mechanical stresses imparted on the laminated strips during the shaping operation will increase the core loss of the finished stator. This approach does not envision annealing of the stator to relieve the mechanical stresses. Stators fabricated from moldable composites of amorphous metal flake will contain numerous air gaps between the discreet flake particles. This will greatly increase the reluctance of the magnetic circuit and the electric current required to operate the motor.

Notwithstanding the advances represented by the above disclosures, there remains a need in the art for improved amorphous metal motor components. This is so because these components are essential for improving the efficiency of motors.

SUMMARY OF THE INVENTION

The present invention provides an amorphous metal magnetic component for a high efficiency radial-flux electric motor. The component may be a rotor or stator. In one embodiment the component comprises a plurality of substantially similarly shaped layers of amorphous metal strips laminated together. Each layer may be generally annular and may further comprise a plurality of tooth sections or poles protruding radially from the annular section and integral therewith. The layers are adhered in registry to the adjacent layers by mechanical or adhesive means. The layers are preferably electrically insulated from one another to reduce eddy current losses.

The present invention further provides a bulk amorphous metal magnetic motor component which exhibits very low core loss under periodic excitation. As a result, the magnetic component is operable at frequencies ranging from DC to as much as 20,000 Hz. It exhibits improved performance characteristics when compared to conventional silicon-steel magnetic components operated over the same frequency range. The component's operability at high frequency allows it to be used in fabricating motors that operate at higher speeds and with higher efficiencies than possible using conventional components. A magnetic component constructed in accordance with the present invention and excited at an excitation frequency "f" to a peak induction level "$B_{max}$" may have a core loss at room temperature less than "L" wherein L is given by the formula $L=0.0074f(B_{max})^{1.3}+0.000282f^{1.5}(B_{max})^{2.4}$, the core loss, the excitation frequency and the peak induction level being measured in watts per kilogram, hertz, and teslas, respectively. The magnetic component may have (i) a core-loss of less than or approximately equal to 1 watt-per-kilogram of amorphous metal material when operated at a frequency of approximately 60 Hz and at a flux density of approximately 1.4 Tesla (T); (ii) a core-loss of less than or approximately equal to 12 watts-per-kilogram of amorphous metal material when operated at a frequency of approximately 1000 Hz and at a flux density of approximately 1.0 T; or (iii) a core-loss of less than or approximately equal to 70 watt-per-kilogram of amorphous metal material when operated at a frequency of approximately 20,000 Hz and at a flux density of approximately 0.30 T.

The bulk amorphous metal magnetic component of the present invention can be manufactured using numerous ferromagnetic amorphous metal alloys. Generally stated, these alloys are defined by the formula: $M_{70-85} Y_{5-20} Z_{0-20}$, subscripts in atom percent, where "M" is at least one of Fe, Ni and Co, "Y" is at least one of B, C and P, and "Z" is at least one of Si, Al and Ge; with the proviso that (i) up to ten (10) atom percent of component "M" can be replaced with at least one of the metallic species Ti, V, Cr, Mn, Cu, Zr, Nb, Mo, Ta, Hf, Ag, Au, Pd, Pt, and W, (ii) up to ten (10) atom percent of components (Y+Z) can be replaced by at least one of the non-metallic species In, Sn, Sb and Pb, and (iii) up to about one (1) atom percent of the components (M+Y+Z) can be incidental impurities.

The present invention also provides methods of constructing a bulk amorphous metal motor component. An implementation includes the steps of stamping laminations of the requisite shape from ferromagnetic amorphous metal strip feedstock, stacking the laminations in registry to form a three-dimensional object, applying and activating adhesive means to adhere the laminations to each other and give the component sufficient mechanical integrity, and finishing the component. The finishing step may include one or more of removing any excess adhesive from the component, giving it a suitable surface finish, and giving it final component dimensions. The method may further comprise one or more optional heat-treating steps to modify the mechanical properties of the amorphous metal feedstock to facilitate punching or to improve the magnetic properties of the component These steps may be carried out in a variety of orders and using a variety of techniques including those set forth hereinbelow.

The present invention is also directed to a bulk amorphous metal component constructed in accordance with the above-described methods. In particular, a bulk amorphous metal magnetic motor component constructed in accordance with the present invention is suited for use as a stator in a high efficiency, radial flux, permanent magnet, DC electric machine.

The present invention further provides a brushless radial-flux DC motor having an amorphous metal stator comprising a plurality of generally annular layers of amorphous metal strips configured to form a generally cylindrical stator. Each layer may further comprise a plurality of tooth-shaped pole sections protruding radially from the generally annular region and integral therewith. The teeth may be directed radially inward in a conventional motor design or outward for use in an inside-out or cup design motor. The motor also comprises a rotor having at least one permanently magnetized section with at least one pair of oppositely directed magnetic poles and bearing means for rotatably supporting the stator and rotor in a predetermined position relative to each other.

The advantages afforded by the present invention include simplified manufacturing, reduced manufacturing time, reduced stresses (e.g., magnetostrictive) encountered during construction of bulk amorphous metal components, and optimized performance of the finished amorphous metal magnetic component.

BRIEF DESCRIPTION OF THE DRAWINGS

The invention will be more fully understood and further advantages will become apparent when reference is had to the following detailed description of the invention and the accompanying drawings, wherein like reference numerals denote similar elements throughout the several views, and in which.

DETAILED DESCRIPTION

The present invention provides an amorphous metal magnetic component for a high efficiency, radial-flux electric machine. The component may be a rotor or stator and comprises a plurality of substantially similarly shaped layers of amorphous metal strips laminated together. Each layer comprises a generally annular section and, optionally, a plurality of tooth sections or poles protruding radially from the annular section and integral therewith. The layers are adhered in registry to the adjacent layers by mechanical or adhesive means. The layers are preferably electrically insulated from one another to reduce eddy current losses. The amorphous metal component of the invention has substantially lower core loss than a comparable component of the prior art, thus increasing the efficiency of an electric machine employing the new component.

Previous attempts to employ amorphous metal in the construction of radial gap electric machines have not resulted in widespread commercial application, because of geometric limitations and the lack of suitable means for forming the required components by conventional punching and cutting means.

Yet there remains a need for further improvements in motor components which exhibit substantially improved AC properties; the most important property being lower core loss. As will be explained below, the requisite combination of high magnetic flux density, high magnetic permeability, and low core loss is afforded by use of the present magnetic component in the construction of electric machines.

Figure 1:
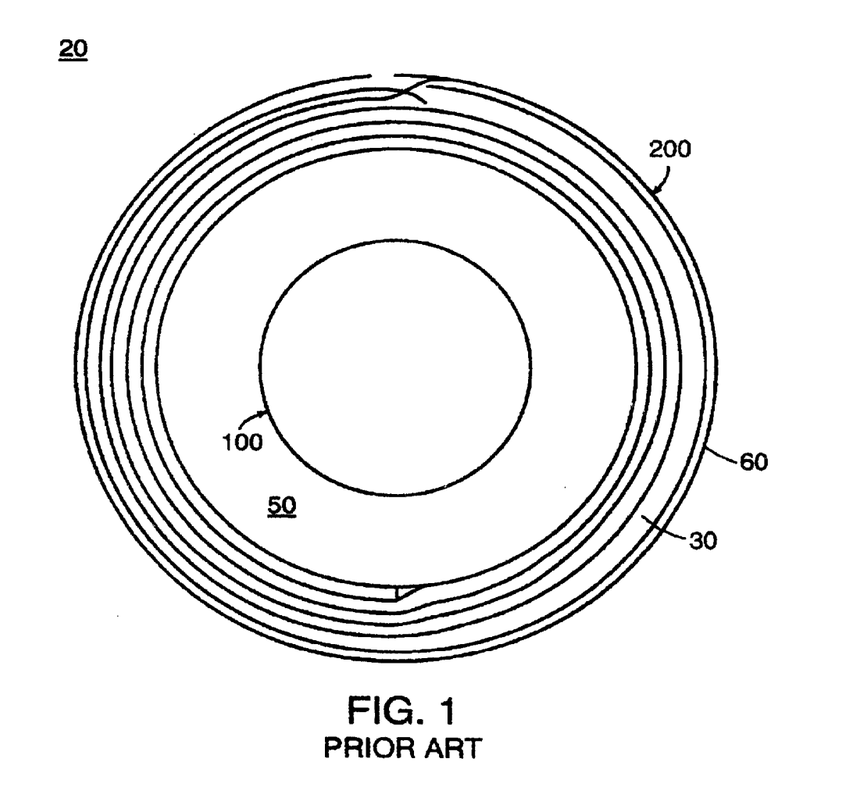
FIG. 1 is a top view of a tape-wound amorphous metal stator and rotor assembly in a prior art radial flux electric motor.

Referring in detail to the drawings, there is shown in FIG. 1 a rotor and stator assembly 20 in a prior art radial flux motor. A stator 200 is comprised of wound amorphous metal tape 30. A rotor 100 is disposed to rotate about an axis of rotation within the stator 200. The "toothless" configuration of the stator 200 defines a substantial air gap 50 between the stator 200 and rotor 100, which disadvantageously limits the performance and control of a motor comprising assembly 20.

Figure 2A:
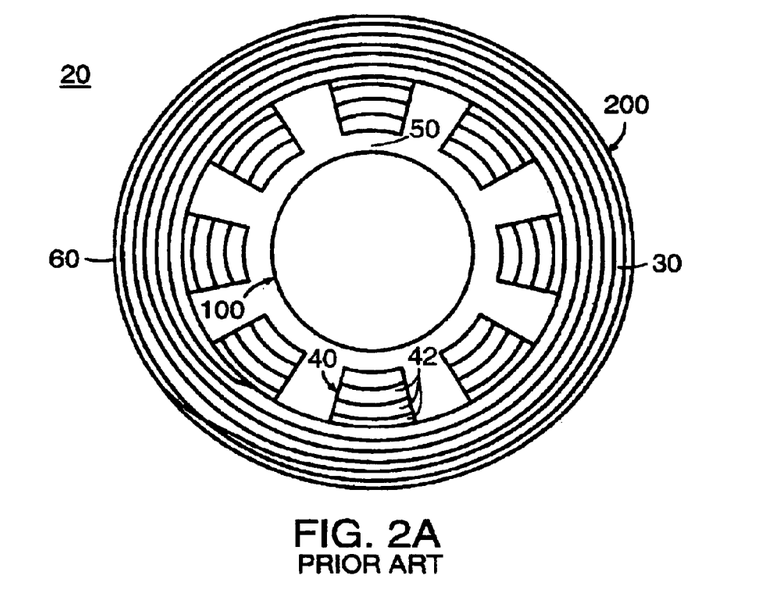
FIGS. 2A and 2B are top views of a stator and rotor assembly in a prior art radial flux electric motor having a tape-wound amorphous metal stator with poles formed from stacks of cut amorphous metal.
Figure 2B:
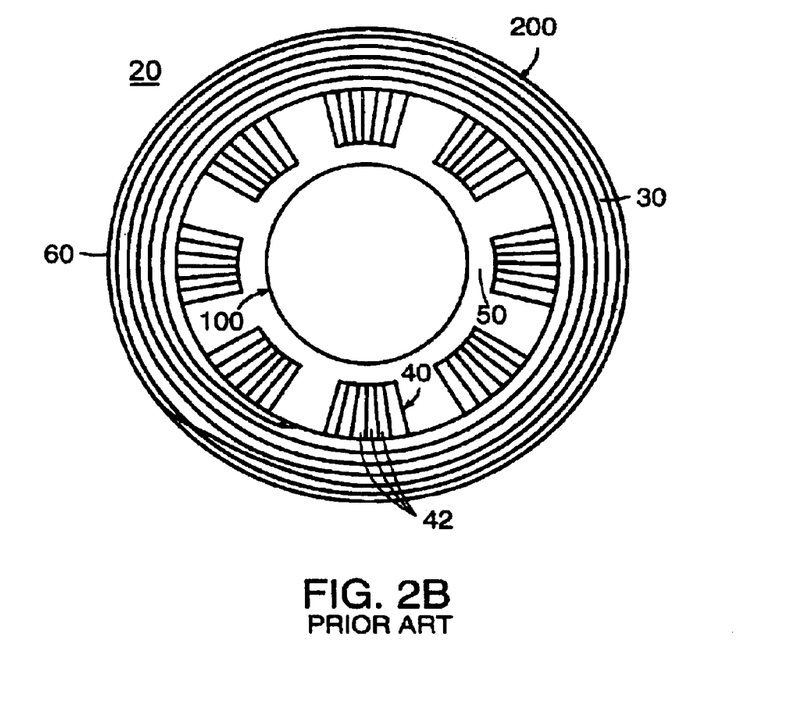

FIGS. 2A and 2B each depict a rotor and stator assembly 20 in a prior art radial flux motor having an amorphous metal stator 200 comprised of wound amorphous metal tape 30 and having a rotor 100 disposed for rotation within the stator 200. The stator 200 includes teeth 40 or poles that extend radially inward toward the rotor 100. Each of the teeth 40 is comprised of a plurality of amorphous metal strips 42 that are oriented either generally parallel to (see, e.g. FIG. 2A) or generally perpendicular to (see, e.g. FIG. 2B) the winding direction of the wound metal tape 30. Although the air gap 50 defined between the rotor 100 and stator poles 40 of FIG. 2A or FIG. 2B is reduced when compared with that of assembly 20 of FIG. 1, the magnetic flux within assembly 20 must cross many layers of amorphous metal, i.e. traverse many air gaps, as the flux passes from the tooth 40 to the back-iron 60 of the stator 200. Furthermore, a substantial vector component of the flux emerging from tooth 40 enters back iron 60 in the direction generally normal to the plane of the layers of amorphous metal in back iron 60. Hence, the time variation of this component of flux induces substantial eddy currents in back iron 60 which, in turn, result in excessive core loss. Consequently, the operational current requirements and power consumption of a motor comprising assembly 20 configured as depicted in FIGS. 2A and 2B are significantly increased. In addition, the thermal characteristics of such a motor are also adversely impacted.

Figure 3A:
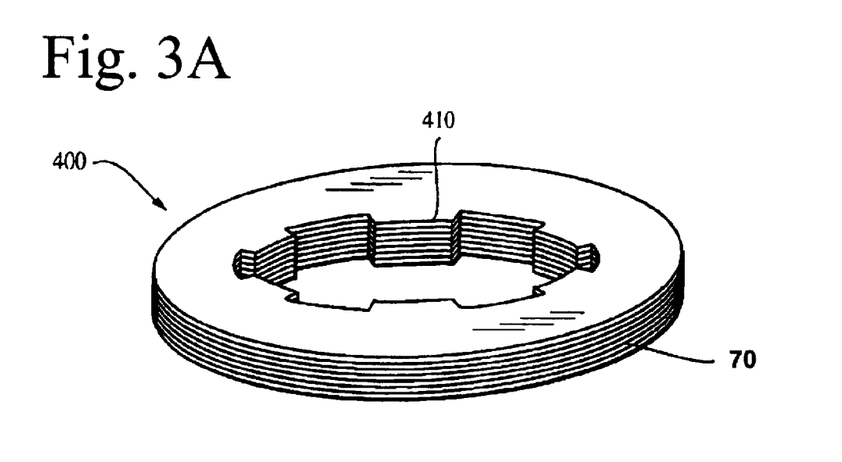
FIG. 3A is a perspective view of a bulk amorphous metal magnetic stator for an electric motor constructed in accordance with the present invention.

The bulk amorphous metal magnetic component 400 depicted in FIG. 3A is generally circular and includes a plurality of generally rectangular teeth 410 that extend radially inward toward the center of the circular component 400. The component 400 is comprised of a plurality of layers 70 or laminations of amorphous metal strip material that are each substantially the same size and shape and that are stacked, laminated together, and then annealed. Each of layers 70 (alternatively called laminations) comprises a generally annular region 412 and a plurality of tooth-shaped sections 410 extending radially inward from annular region 412 and integral therewith. Slot regions 414 formed between sections 410 afford a space in which electric windings (not shown) may be placed. A bulk amorphous metal component constructed in accordance with the embodiment of FIG. 3A may be used as a stator in a radial flux electric motor. In fact, the present magnetic components include rotors and stators that may be used in radial flux machines of conventional geometry.

Figure 3B:
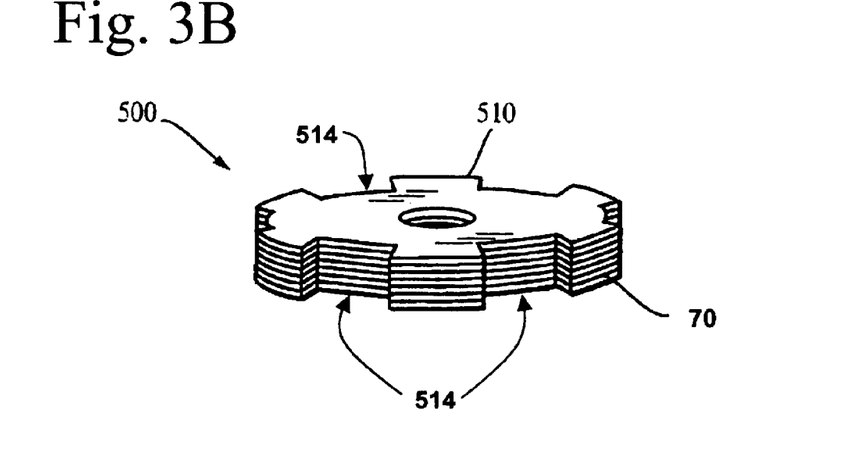
FIG. 3B is a perspective view of a bulk amorphous metal magnetic rotor for an electric motor constructed in accordance with the present invention.

The bulk amorphous metal component 500 depicted in FIG. 3B is generally disc-shaped and includes a plurality of generally rectangular teeth 510 that extend radially outward. The component 500 is comprised of a plurality of layers 70 of amorphous metal strip material that are each substantially the same size and shape and that are stacked, laminated together, and then annealed. Each of layers 70 comprises a generally annular region 512 and a plurality of tooth-shaped sections 510 extending radially outward from annular region 512 and integral therewith. Slot regions 514 found between sections 510 afford a space in which electrical windings (not shown) may be placed. A bulk amorphous metal component constructed in accordance with the embodiment of FIG. 3B may be used as a rotor in a radial flux gap electric motor. A component of this shape may also be used as a rotor in a switched reluctance motor. Alternatively, a component with this shape may be used as a stator in an inside-out radial flux electric motor.

Figure 4:
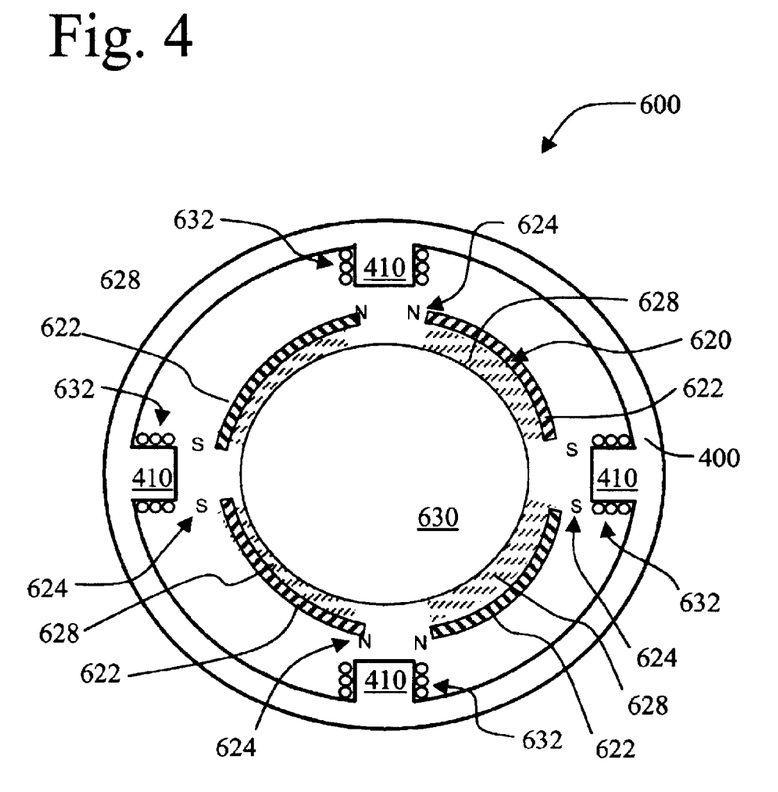
FIG. 4 is an axial view of a brushless DC permanent magnet motor with an amorphous metal stator.

Referring next to FIG. 4 there is shown a brushless radial flux DC motor 600 constructed of the present component. Motor 600 has a rotor 620 rotatingly disposed within an embodiment of an amorphous metal stator 400. The rotor 620 is rotatingly supported within the stator 400 by bearing means (not shown) known in the art. Rotor 620 comprises four permanently magnetized regions 622 each having a pair of oppositely directed magnetic poles 624 labeled N and S to denote the respective magnetic north and south poles. Each magnetized region 622 may be comprised of a permanent magnet (such as a ferrite or rare earth magnet) adhesively affixed by epoxy 628 to a central rotating shaft 630. Electrical windings 632 encircle each tooth section 410 of stator 400. The windings 632 may be energized by conventional motor drive circuitry (not shown) which provides a source of alternating current to cause motor 600 to operate. The advantages recognized in constructing such a motor 600 include simplified manufacturing and reduced manufacturing time, reduced stresses (i.e., magnetostrictive) encountered during construction of amorphous metal components, reduced core loss, and optimized performance of the finished amorphous metal stator.

It will be recognized by those skilled in the art that the term "electric motor," as used herein, refers generically to a variety of rotating electrical machines which additionally may include electric generators as well as regenerative motors that may be operated optionally as electric generators. The described amorphous metal component may be employed in constructing any of these devices. The component presented here is suitable for use in constructing motors of a wide range of type, size and power rating, including miniature motors for microelectronic devices and actuators up to integral horsepower motors for traction and large industrial applications. The component is suitable for different types of radial flux motors, including brushless and brush-type DC motors, switched reluctance motors, other synchronous motors, and induction motors. It will also be understood by those skilled in the art that radial flux motors may include one or more rotors and one or more stators. Accordingly, the terms "a rotor" and "a stator" as used herein with reference to motors includes a number of rotors and stators ranging from one to as many as three or more. Furthermore, "inside-out" machines are known in the art, and generally include motors that have the rotor located outside the stator, wherein the rotor is of a larger diameter than the stator. The skilled artisan will recognize that the component described herein may also be used in such a machine.

A three-dimensional magnetic component 400 or 500 constructed as described exhibits low core loss. When excited at an excitation frequency "f" to a peak induction level "$B_{max}$", the component may have a core loss at room temperature less than "L" wherein L is given by the formula $L=0.0074f(B_{max})^{1.3}+0.000282f^{1.5}(B_{max})^{2.4}$, the core loss, the excitation frequency and the peak induction level being measured in watts per kilogram, hertz, and teslas, respectively. In another embodiment, the magnetic component may have (i) a core-loss of less than or approximately equal to 1 watt-per-kilogram of amorphous metal material when operated at a frequency of approximately 60 Hz and at a flux density of approximately 1.4 Tesla (T); (ii) a core-loss of less than or approximately equal to 12 watts-per-kilogram of amorphous metal material when operated at a frequency of approximately 1000 Hz and at a flux density of approximately 1.0 T, or (iii) a core-loss of less than or approximately equal to 70 watt-per-kilogram of amorphous metal material when operated at a frequency of approximately 20,000 Hz and at a flux density of approximately 0.30 T. The reduced core loss of the component advantageously improves the efficiency of an electrical device that incorporates it.

The low values of core loss make the bulk magnetic component especially suited for applications wherein the component is subjected to a high frequency magnetic excitation, e.g., excitation occurring at a frequency of at least about 100 Hz. The inherent high core loss of conventional steels at high frequency renders them unsuitable for use in devices requiring high frequency excitation. These core loss performance values apply to the various embodiments of the component, regardless of the specific geometry of the bulk amorphous metal component For example, any synchronous motor operates at a rotational speed proportional to the ratio of the excitation frequency and the number of poles in the motor. By using the described amorphous metal component instead of a conventional steel component, such a motor may be designed with a much higher pole count. Yet the motor is still operable at the same speed because the required increase in excitation frequency does not result in excessive core loss. This flexibility is especially desirable in variable speed applications. In many cases, the ability to operate over a wide speed range will allow a designer to eliminate a gear-train or transmission system that would otherwise be required with a conventional motor. Eliminating these parts from a mechanical system improves efficiency and reliability.

The bulk amorphous metal magnetic component can be manufactured using numerous ferromagnetic amorphous metal alloys. Generally stated, the alloys suitable for use in the component are defined by the formula: $M_{70-85}$ $Y_{5-20}$ $Z_{0-20}$, subscripts in atom percent, where "M" is at least one of Fe, Ni and Co, "Y" is at least one of B, C and P, and "Z" is at least one of Si, Al and Ge; with the proviso that (i) up to ten (10) atom percent of component "M" can be replaced with at least one of the metallic species Ti, V, Cr, Mn, Cu, Zr, Nb, Mo, Ta, Hf, Ag, Au, Pd, Pt, and W, (ii) up to ten (10) atom percent of components (Y+Z) can be replaced by at least one of the non-metallic species In, Sn, Sb and Pb, and (iii) up to about one (1) atom percent of the components (M+Y+Z) can be incidental impurities. As used herein, the term "amorphous metallic alloy" means a metallic alloy that substantially lacks any long range order and is characterized by X-ray diffraction intensity maxima which are qualitatively similar to those observed for liquids or inorganic oxide glasses.

The alloy suited for use in fabricating the component is ferromagnetic at the temperature at which the component is to be used. A ferromagnetic material is one which exhibits strong, long-range coupling and spatial alignment of the magnetic moments of its constituent atoms at a temperature below a characteristic temperature (generally termed the Curie temperature) of the material. It is preferred that the Curie temperature of material to be used in a device operating at room temperature be at least about 200° C. and preferably at least about 375° C. Devices may be operated at other temperatures, including down to cryogenic temperatures or at elevated temperatures, if the material to be incorporated therein has an appropriate Curie temperature.

As is known, a ferromagnetic material may further be characterized by its saturation induction or equivalently, by its saturation flux density or magnetization. A suitable alloy has a saturation induction of at least about 1.2 tesla (T) and, more preferably, a saturation induction of at least about 1.5 T. The alloy also has high electrical resistivity of at least about 100 $\mu\Omega$-cm, and preferably at least about 130 $\mu\Omega$-cm.

Amorphous metal alloys suitable for use as feedstock are commercially available, generally in the form of continuous thin strip or ribbon in widths up to 20 cm or more and in thicknesses of approximately 20–25 $\mu$m. These alloys are formed with a substantially fully glassy microstructure (e.g., at least about 80% by volume of material having a non-crystalline structure). The alloys are suitably formed with essentially 100% of the material having a non-crystal line structure. Volume fraction of non-crystalline structure may be determined by methods known in the art such as x-ray, neutron, or electron diffraction, transmission electron microscopy, or differential scanning calorimetry. Highest induction values at low cost are achieved for alloys wherein "M" is iron, "Y" is boron and "Z" is silicon. For this reason, amorphous metal strip composed of an iron-boron-silicon alloy is preferred. More specifically, a suitable alloy contains at least 70 atom percent Fe, at least 5 atom percent B, and at least 5 atom percent Si, with the proviso that the total content of B and Si be at least 15 atom percent. A suitable amorphous metal strip has a composition consisting essentially of about 11 atom percent boron and about 9 atom percent silicon, the balance being iron and incidental impurities. This strip, having a saturation induction of about 1.56 T and a resistivity of about 137 $\mu\Omega$-cm, is sold by Honeywell International Inc. under the trade designation METGLAS® alloy 2605SA-1. It will be appreciated by those skilled in the art that embodiments which entail continuous, automatic feeding of feedstock material through a stamping press may conveniently employ, for example, amorphous metal supplied as spools of thin ribbon or strip. Alternatively, other forms of feedstock and other feeding schemes could be used, including manual feeding of shorter lengths of strip or other shapes not having a uniform width.

The mechanical and magnetic properties of the amorphous metal strip appointed for use in the component may be enhanced by thermal treatment at a temperature and for a time sufficient to provide the requisite enhancement without altering the substantially fully glassy microstructure of the strip. The heat treatment comprises a heating portion, an optional soak portion and a cooling portion. A magnetic field may optionally be applied to the strip during at least a portion, such as during at least the cooling portion, of the heat treatment. Application of a field, preferably along the direction in which flux lies during operation of the stator, may in some cases further improve magnetic properties of the component and reduce its core loss.

The magnetic properties of certain amorphous alloys suitable for use in an amorphous metal stator 400 may be significantly improved by heat treating the alloy to form therein a nanocrystalline microstructure. This microstructure is characterized by the presence of a high density of grains having average size less than about 100 nm, preferably less than 50 nm, and more preferably about 10–20 nm. The grains preferably occupy at least 50% of the volume of the iron-base alloy. These materials have low core loss and low magnetostriction. The latter property also renders the material less vulnerable to degradation of magnetic properties by stresses resulting from the fabrication and/or operation of component 10. The heat treatment needed to produce the nanocrystalline structure in a given alloy must be carried out at a higher temperature or for a longer time than would be needed for a heat treatment designed to preserve therein a substantially fully glassy microstructure. As used herein the terms amorphous metal and amorphous alloy further include a material initially formed with a substantially fully glassy microstructure and subsequently transformed by heat treatment or other processing to a material having a nanocrystalline microstructure. Amorphous alloys which may be heat treated to form a nanocrystalline microstructure are also often termed, simply, nanocrystalline alloys. The present method allows a nanocrystalline alloy to be formed into the requisite geometrical shape of the finished stator. Such formation is advantageously accomplished while the alloy is still in its as-cast, ductile, substantially non-crystalline form; before it is heat-treated to form the nanocrystalline structure which generally renders it more brittle and more difficult to handle.

Two classes of alloy having magnetic properties significantly enhanced by formation therein of a nanocrystalline microstructure are given by the following formulas in which the subscripts are in atom percent.

A first such class of nanocrystalline alloy is $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 3 to 12, y ranges from 0 to about 4, z ranges from about 5 to 12, and w ranges from 0 to less than about 8. After this alloy is heat treated to form a nanocrystalline microstructure therein, it has high saturation induction (e.g., at least about 1.5 T), low core loss, and low saturation magnetostriction (e.g. a magnetostriction having an absolute value less than $4 \times 10^{-6}$). Such an alloy is useful for applications wherein a motor of minimum size for the required power and torque is demanded.

A second such class of nanocrystalline alloy is $Fe_{100-u-x-y-z-w}R_uT_xQ_yB_zSi_w$, wherein R is at least one of Ni and Co, T is at least one of Ti, Zr, Hf, V, Nb, Ta, Mo, and W, Q is at least one of Cu, Ag, Au, Pd, and Pt, u ranges from 0 to about 10, x ranges from about 1 to 5, y ranges from 0 to about 3, z ranges from about 5 to 12, and w ranges from about 8 to 18. After this alloy is heat treated to form a nanocrystalline microstructure therein, it has a saturation induction of at least about 1.0 T, an especially low core loss, and low saturation magnetostriction (e.g. a magnetostriction having an absolute value less than $4 \times 10^{-6}$). Such an alloy is useful in a motor required to operate at very high speed (e.g., requiring an excitation frequency of 1000 Hz or more).

Also provided is a method of constructing a bulk amorphous metal component. In an implementation, the method includes the steps of stamping laminations in the requisite shape from ferromagnetic amorphous metal strip feedstock, stacking the laminations in registry to form a three-dimensional object, applying and activating adhesive means to adhere the laminations to each other and give the component sufficient mechanical integrity, and finishing the component to remove any excess adhesive and give it a suitable surface finish and final component dimensions. The method may further include an optional annealing step to improve the mechanical properties of the amorphous metal feedstock and the magnetic properties of the component. These steps may be carried out in a variety of orders and using a variety of techniques including those set forth herein.

Historically, two factors have combined to preclude the use of stamping as a viable approach to forming amorphous metal parts. First and foremost, amorphous metals tend to be significantly harder than typical metallic punch and die materials. Iron based amorphous metal typically exhibits hardness in excess of 1100 kg/mm². By comparison, air cooled, oil quenched and water quenched tool steels are restricted to hardness in the 800 to 900 kg/mm² range. Thus, the amorphous metals, which derive their hardness from their unique atomic structures and chemistries, are harder than conventional metallic punch and die materials.

Secondly, amorphous metals undergo significant deformation prior to failure when constrained between the punch and die during stamping. Amorphous metals deform by highly localized shear flow. When deformed in tension, such as when an amorphous metal strip is pulled, the formation of a single shear band can lead to failure at small, overall deformation. In tension, failure can occur at an elongation of 1% or less. However, when deformed in a manner such that a mechanical constraint precludes plastic instability, such as in bending between the tool and die during stamping, multiple shear bands are formed and significant localized deformation can occur. In such a deformation mode, the elongation at failure can locally exceed 100%.

These two factors, exceptional hardness plus significant deformation, combine to produce extraordinary wear on the punch and die components of the stamping press using conventional stamping equipment, tooling and processes. Wear on the punch and die occurs by direct abrasion of the hard amorphous metal rubbing against the softer punch and die materials during deformation prior to failure.

In order to minimize the wear on the punch and die during the stamping process, the punch and die may be fabricated from advanced materials, and the tooling is such that the clearance between the punch and the die is small and uniform. The stamping process is also operated at high strain rates. The advanced materials used for the punch and die tooling should have a hardness of at least 1100 kg/mm$^2$ and preferably greater than 1300 kg/mm$^2$. Suitable advanced materials may include carbides, carbide metal composites, ceramics, ceramic metal composites, and amorphous metals. Tooling with hardness equal to or greater than that of amorphous metal will resist direct abrasion from the amorphous metal during the stamping process thereby minimizing the wear on the punch and die. The clearance between the punch and the die should be less than 0.125 mm (0.005 inch) and preferably less than 0.0125 mm (0.0005 inch). The strain rate used in the stamping process should be at least one punch stroke per second and preferably at least five punch strokes per second. The small clearance between the punch and the die and the high strain rate used in the stamping process combine to limit the amount of mechanical deformation of the amorphous metal prior to failure during the stamping process. Limiting the mechanical deformation of the amorphous metal in the die cavity limits the direct abrasion between the amorphous metal and the punch and die process thereby minimizing the wear on the punch and die.

The thermal treatment of the amorphous metal may employ any heating means which results in the metal experiencing the required thermal profile. Suitable heating means include infra-red heat sources, ovens, fluidized beds, thermal contact with a heat sink maintained at an elevated temperature, resistive heating effected by passage of electrical current through the strip, and inductive (RF) heating. The choice of heating means may depend on the ordering of the required processing steps enumerated above. A magnetic field may optionally be applied to the amorphous metal during at least a portion, such as the cooling portion, of the heat treatment.

Furthermore, the heat treatment may be carried out either on strip material prior to the stamping step, on discrete laminations after the stamping step but before the stacking step, or on a stack subsequent to the stacking step. The heat treatment may be done prior to the stamping step in a separate, off-line batch process on bulk spools of material, in an oven or fluidized bed, or in a continuous spool-to-spool process passing the strip from a payoff spool, through a heated zone, and onto a takeup spool. Alternatively the heat treatment may be done in-line by passing the ribbon continuously from a payoff spool through a heated zone and thereafter into the punch press for subsequent punching and stacking steps.

The heat treatment also may be carried out on discrete laminations after the punching step but before stacking. In this embodiment, the laminations may exit the punch and be directly deposited onto a moving belt which conveys them through a heated zone, thereby causing the laminations to experience the appropriate time-temperature profile.

In another implementation, the heat treatment is carried out after discrete laminations are stacked in registry. Suitable heating means for annealing such a stack include ovens, fluidized beds, and induction heating.

Heat treatment of the strip material prior to stamping may alter the mechanical properties of the amorphous metal. Specifically, heat treatment will reduce the ductility of the amorphous metal, thereby limiting the amount of mechanical deformation in the amorphous metal prior to fracture during the stamping process. Reduced ductility of the amorphous metal will also reduce the direct abrasion and wear of the punch and die materials by the deforming amorphous metal.

Adhesive means may be used to adhere a plurality of laminations of amorphous metal material in registry to each other, thereby allowing construction of a bulk, three-dimensional object with sufficient structural integrity for handling, use, or incorporation into a larger structure. A variety of adhesives may be suitable, including epoxies, varnishes, anaerobic adhesives, and room-temperature-vulcanized (RTV) silicone materials. Adhesives desirably have low viscosity, low shrinkage, low elastic modulus, high peel strength, and high dielectric strength. Epoxies may be either multi-part whose curing is chemically activated or single-part whose curing is activated thermally or by exposure to ultra-violet radiation. Suitable methods for applying the adhesive include dipping, spraying, brushing, and electrostatic deposition. In strip or ribbon form amorphous metal may also be coated by passing it over rods or rollers which transfer adhesive to the amorphous metal. Rollers or rods having a textured surface, such as gravure or wire-wrapped rollers, are especially effective in transferring a uniform coating of adhesive onto the amorphous metal. The adhesive may be applied to an individual layer of amorphous metal at a time, either to strip material prior to punching or to laminations after punching. Alternatively, the adhesive means may be applied to the laminations collectively after they are stacked. In this case, the stack is impregnated by capillary flow of the adhesive between the laminations. The stack may be placed either in vacuum or under hydrostatic pressure to effect more complete filling, yet minimizing the total volume of adhesive added, thus assuring high stacking factor.

Where the adhesive is cured at a temperature of at least 175° C., the heat treatment associated with curing may also serve to affect magnetic properties as discussed above.

Figure 5A:
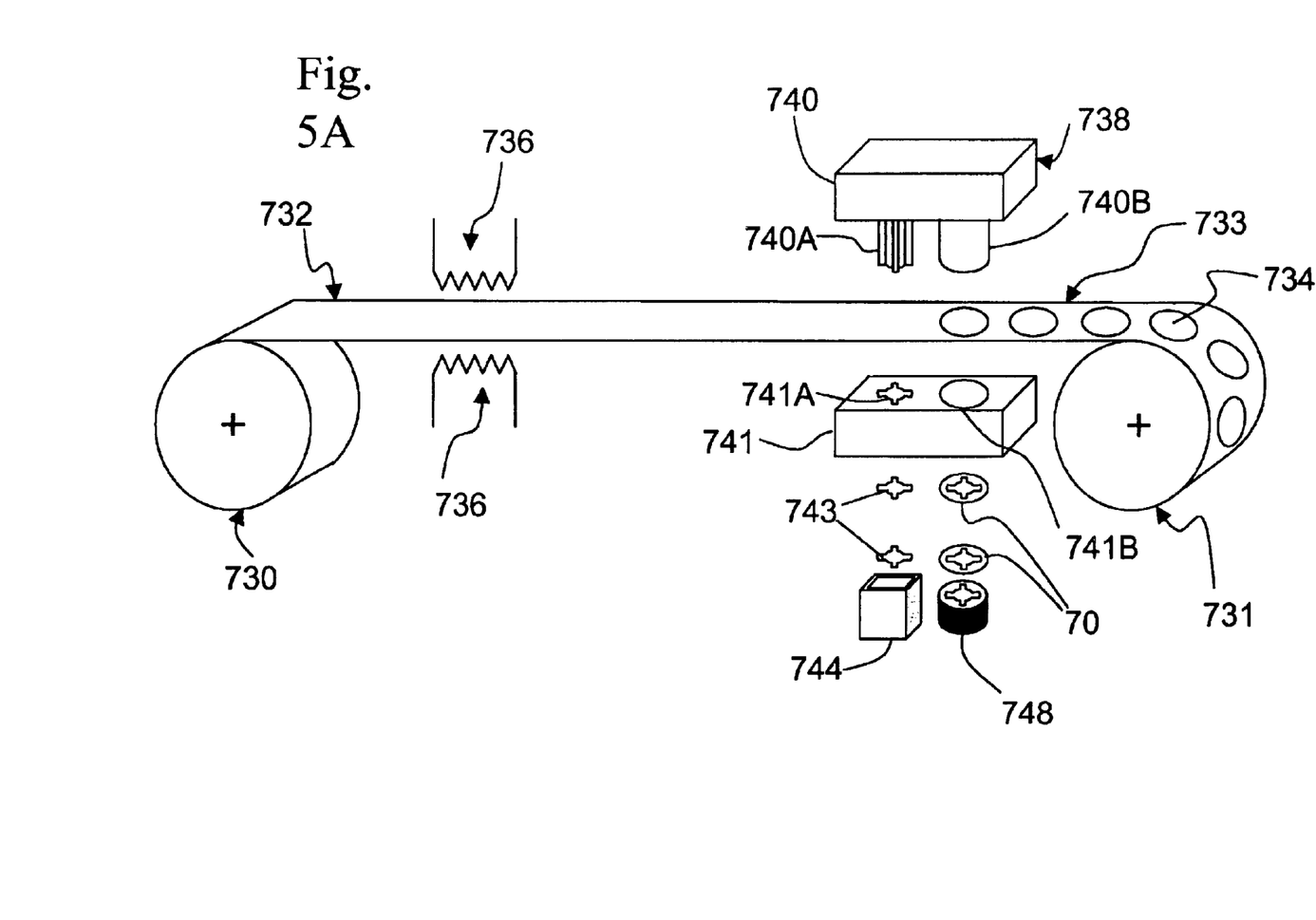
FIG. 5A is a side view of a coil of ferromagnetic amorphous metal strip positioned to be annealed and stamped, and of ferromagnetic amorphous metal laminations positioned to be stacked in accordance with the present invention.

A first embodiment of the stamping method of the invention is illustrated in FIG. 5A. A roll 730 of ferromagnetic amorphous metal strip material 732 is fed continuously through an annealing oven 736 which raises the temperature of the strip to a level and for a time sufficient to effect improvement in the magnetic properties of the strip. The strip material 732 is then passed into an automatic high-speed punch press 738 between a punch 740 and an open-bottom die 741. Punch 740 has a first segment 740A and a second segment 740B which mate with segments 741A and 741B of die 741, respectively. Punch segment 740A and die segment 741A are shaped to remove material from strip 732 to form the inside cutout shape of lamination 70 (shown in FIG. 3B), while segments 740B and 741B are shaped to form the outside perimeter of lamination 70 (shown in FIG. 3A). Formation of each lamination 70 is accomplished in two punch strokes. The first stroke removes the inside section 743 from the portion of strip 732 positioned between opposing segments 740A and 741A. Section 743 is then removed from the bottom of die 741 and discarded in receptacle 744. Strip 732 is then indexed to bring the axis of the cutout into alignment with opposing segments 740B and 741B. A second punch stroke is then initiated. It acts to complete the formation of lamination 70, which is cut and removed from strip 732. Lamination 70 is removed from die 741 either by gravity from the bottom of segment 741B or by other means causing it to be transported into collecting magazine 748. A skeleton 733 of strip material 732 remains and contains holes 734 from which completed laminations 70 have been removed. Skeleton 733 is collected on a takeup spool 731. Strip material 732 may be fed into press 738 either in a single layer or in multiple layers (not illustrated), either from multiple payoffs or by prior pre-spooling of multiple layers. Use of multiple layers of strip material 732 advantageously reduces the number of punch strokes required to produce a given number of laminations 70. As the punching process continues, a plurality of laminations 70 are collected in magazine 748 in sufficiently well-aligned registry. After a requisite number of laminations 70 are punched and deposited into the magazine 748, the operation of punch press 738 is interrupted. The requisite number may either be pre-selected or may be determined by the height or weight of laminations 70 received in magazine 748. Magazine 748 is then removed from punch press 738 for further processing. A low-viscosity, heat-activated epoxy (not shown) may be allowed to infiltrate the spaces between laminations 70 which are maintained in registry by the walls of magazine 748. The epoxy is then activated by exposing the entire magazine 748 and laminations 70 contained therein to a source of heat for a time sufficient to effect the cure of the epoxy. The now laminated stack 400 (see e.g. FIG. 3A) of laminations 70 is removed and the surface of stack 400 finished by removing any excess epoxy.

Figure 5B:
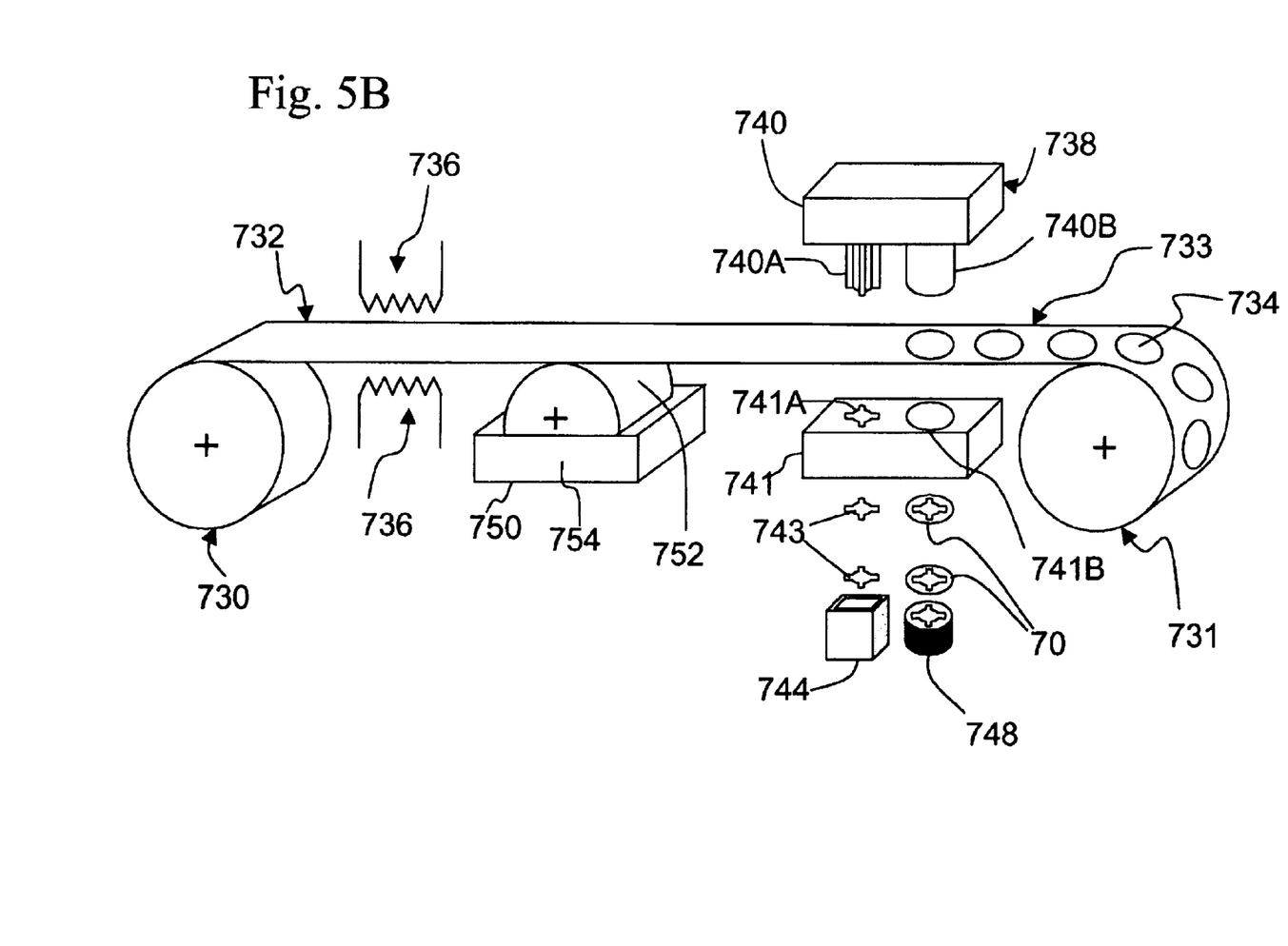
FIG. 5B is a side view of a coil of ferromagnetic amorphous metal strip positioned to be annealed, coated with an epoxy and stamped, and of ferromagnetic amorphous metal laminations positioned to be stacked in accordance with the present invention.

A second embodiment is shown in FIG. 5B. A roll 730 of ferromagnetic amorphous metal strip material 732 is fed continuously through an annealing oven 736 which raises its temperature to a level and for a time sufficient to effect improvement in the magnetic properties of strip 732. Strip 732 is then passed through an adhesive application means 750 comprising a gravure roller 752 onto which low-viscosity, heat-activated epoxy is supplied from adhesive reservoir 754. The epoxy is thereby transferred from roller 752 onto the lower surface of strip 732. The distance between annealing oven 736 and the adhesive application means 750 is sufficient to allow strip 732 to cool to a temperature at least below the thermal activation temperature of epoxy during the transit time of strip 732. Alternatively, cooling means (not illustrated) may be used to achieve a more rapid cooling of strip 732 between oven 736 and application means 750. Strip material 732 is then passed into an automatic high-speed punch press 738 and between a punch 740 and an open-bottom die 741. A two-step punching sequence similar to that used for the first embodiment of the stamping method described above with respect to FIG. 5A is then carried out. After a requisite number of laminations 70 are punched and deposited in registry into the magazine 748, the operation of punch press 738 is interrupted. The requisite number may either be pre-selected or may be determined by the height or weight of laminations 70 received in magazine 748. Magazine 748 is then removed from punch press 738 for further processing. Additional low-viscosity, heat-activated epoxy (not shown) may be allowed to infiltrate the spaces between the laminations 70 which are maintained in registry by the walls of magazine 748. The epoxy is then activated by exposing the entire magazine 748 and laminations 70 contained therein to a source of heat for a time sufficient to effect the cure of the epoxy. The now laminated stack 400 (see FIG. 3A) of laminations 70 is removed from the magazine and the surface of stack 400 may be finished by removing any excess epoxy.

Figure 5C:
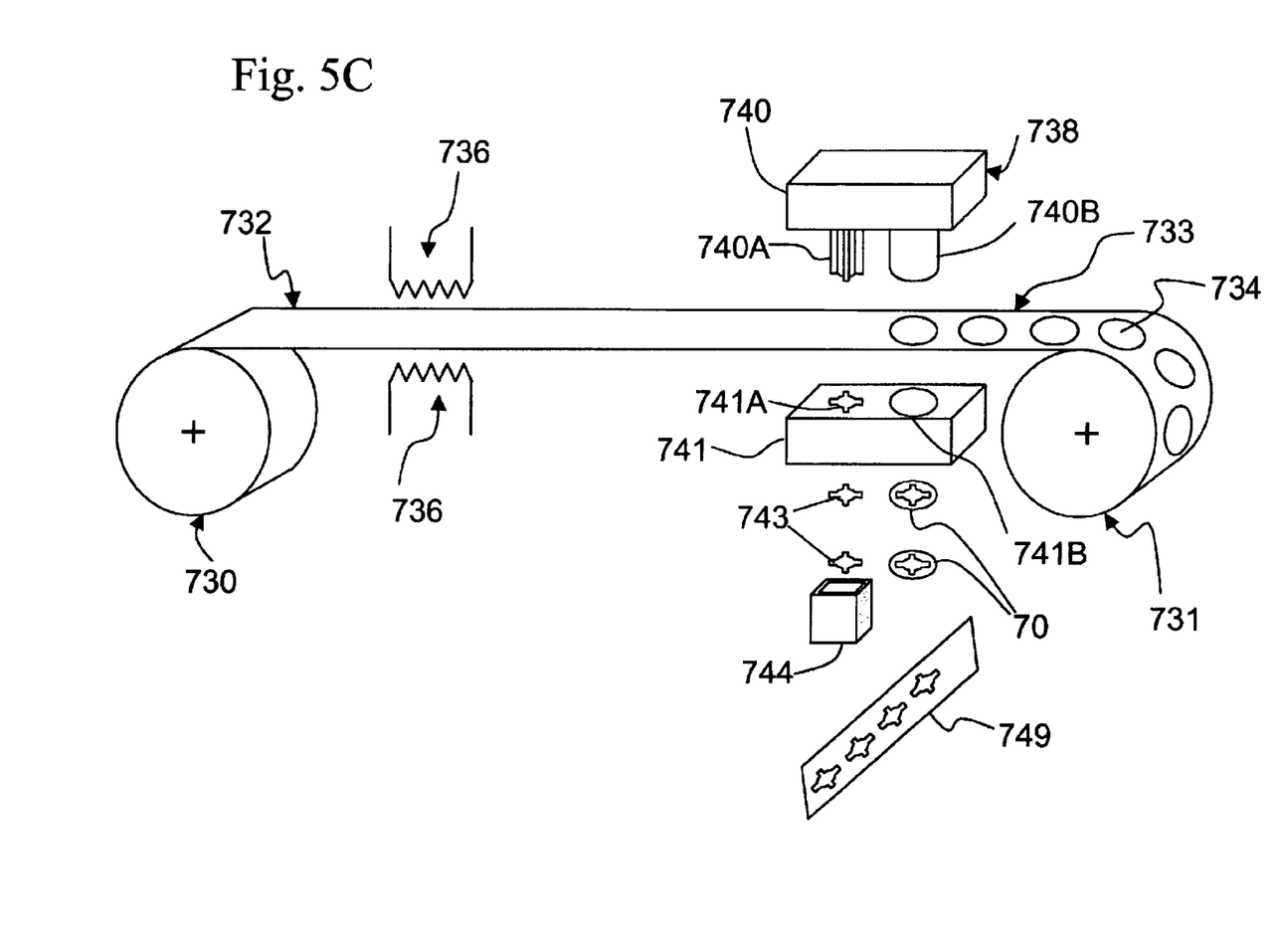
FIG. 5C is a side view of a coil of ferromagnetic amorphous metal strip positioned to be stamped, and of ferromagnetic amorphous metal laminations positioned to be collected in accordance with the present invention.

A third embodiment is shown in FIG. 5C. A ferromagnetic amorphous metal strip is first annealed in an inert gas box oven (not shown) at a pre-selected temperature and for a pre-selected time sufficient to effect improvement of its magnetic properties without altering the substantially fully glassy microstructure thereof. The heat treated strip 732 is then fed from roll 730 into an automatic high-speed punch press 738 and between a punch 740 and an open-bottom die 741. A two-step punching sequence similar to that used for the first embodiment of the stamping method is then carried out causing lamination 70 of the required shape to be formed. Lamination 70 then falls or is transported out of die 741 into a collection device 749. The collection device 749 may be a conveyor belt as shown in FIG. 5C, or may be a container or vessel for collecting the laminations 70. A skeleton 733 of strip material 732 remains and contains holes 734 from which laminations 70 have been removed. Skeleton 733 is collected on takeup spool 731. After each punching action is accomplished, the strip 732 is indexed to prepare the strip for another punching cycle. The punching process is continued until a pre-selected number of laminations 70 are stamped and collected in a vessel, then the press cycle is stopped. One side of each lamination 70 may then be manually coated with an anaerobic adhesive and the laminations stacked in registry in an alignment fixture (not shown). The adhesive is allowed to cure. The now laminated stack 400 of laminations 70 is removed from the alignment fixture and the surface of stack 400 finished by removing any excess adhesive.

Figure 5D:
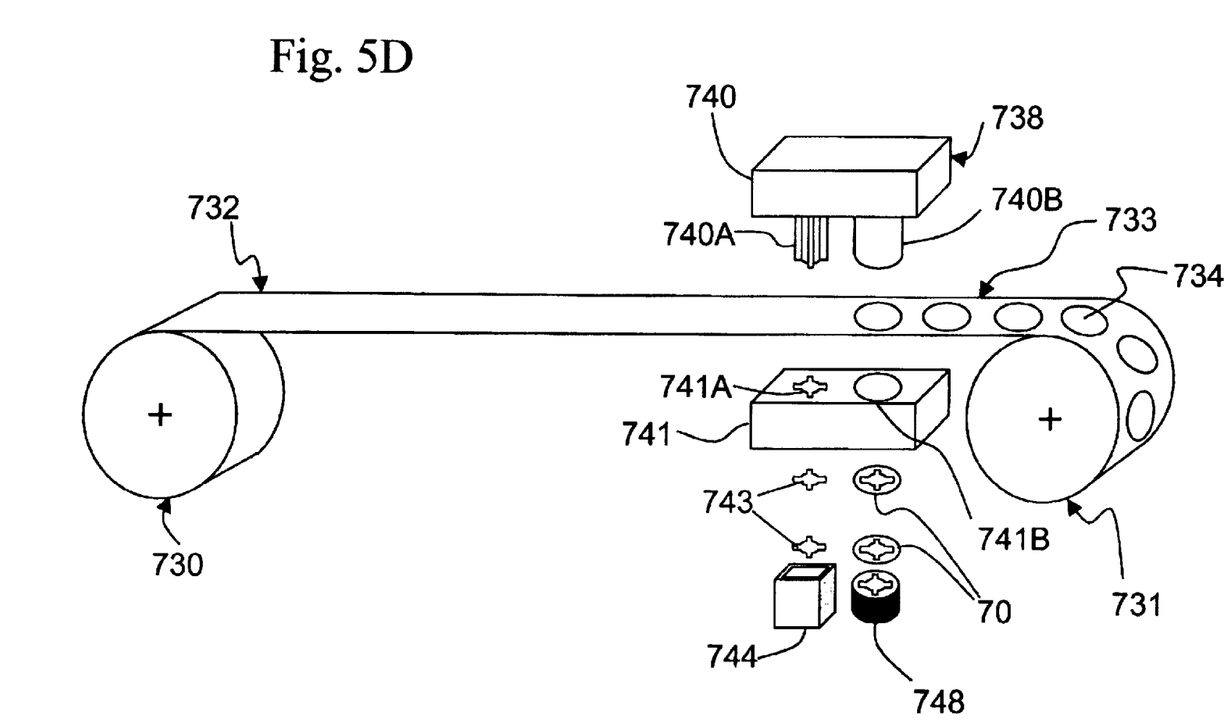
FIG. 5D is a side view of a coil of ferromagnetic amorphous metal strip positioned to be stamped, and of ferromagnetic amorphous metal laminations positioned to be stacked in accordance with the present invention.

Another embodiment is shown in FIG. 5D. A roll 730 of ferromagnetic amorphous metal strip material 732 is fed continuously into an automatic high-speed punch press 738 and between a punch 740 and an open-bottom die 741. A two-step punching sequence similar to that used for the first embodiment of the stamping method is then carried out. Lamination 70 then falls into or is transported to a collecting magazine 748 and punch 740 is retracted. A skeleton 733 of strip material 732 remains and contains holes 734 from which laminations 70 have been removed. Skeleton 733 is collected on takeup spool 731. After each punching action is accomplished, the strip 732 is indexed to prepare the strip for another punching cycle. Strip material 732 may be fed into press 738 either in a single layer or in multiple layers (not illustrated), either from multiple payoffs or by prior pre-spooling of multiple layers. Use of multiple layers of strip material 732 advantageously reduces the number of punch strokes required to produce a given number of laminations 70. The punching process is continued and a plurality of laminations 70 are collected in magazine 748 in sufficiently well-aligned registry. After a requisite number of laminations 70 are punched and deposited into magazine 748, the operation of punch press 738 is interrupted. The requisite number may either be pre-selected or may be determined by the height or weight of laminations 70 received in magazine 748. Magazine 748 is then removed from punch press 738 for further processing. In an implementation, magazine 748 and laminations 70 contained therein are placed in an inert gas box oven (not shown) and heat-treated by heating them to a pre-selected temperature and holding them at that temperature for a pre-selected time sufficient to effect improvement of its magnetic properties without altering the substantially fully glassy microstructure of the amorphous metal laminations. The magazine and laminations are then cooled to ambient temperature. A low-viscosity, heat-activated epoxy (not shown) is allowed to infiltrate the spaces between laminations 70 which are maintained in registry by the walls of magazine 748. Epoxy is then activated by placing the entire magazine 748 and laminations 70 contained therein in a curing oven for a time sufficient to effect the cure of the epoxy. The now laminated stack 400 (see FIG. 3A) of laminations 70 is removed and the surface of stack 400 finished by removing any excess epoxy.

A number of other cutting means are suitable for fabricating the component of the invention. In one implementation these means may be used to cut individual, discrete laminations, either singly or a few at a time, which may then be laminated together to form the bulk component. In another implementation, a plurality of layers of amorphous metal may be laminated together to form a three-dimensional object having mechanical integrity which is then cut to form the component in the desired shape. Suitable cutting means include, but are not limited to, an abrasive wheel, a wire saw, an electric discharge machine device, a water jet, a laser, or a photoetching device. A variety of electro-discharge cutting techniques exist including wire electro-discharge machining, plunge electro-discharge machining and electro-chemical machining. As is conventional, photoetching may include the steps of lithographically depositing an etchant-resistant layer defining the desired final shape of each individual lamination onto the surface of the amorphous metal feedstock and then using acid or other etchant to chemically erode the material that is unprotected by the resistant layer, to thus form the desired workpieces.

As noted above, the magnetic component of the invention exhibits lower core loss than similarly dimensioned components made from conventional steels. As is known in the art, core loss is that dissipation of energy which occurs within a ferromagnetic material as the magnetization thereof is changed with time. The core loss of a given magnetic component is generally determined by cyclically exciting the component. A time-varying magnetic field is applied to the component to produce therein a corresponding time variation of the magnetic induction or flux density. For the sake of standardization of measurement, the excitation is generally chosen such that the magnetic induction varies sinusoidally with time at a frequency "f" and with a peak amplitude "$B_{max}$." The core loss is then determined by known electrical measurement instrumentation and techniques. Loss is conventionally reported as watts per unit mass or volume of the magnetic material being excited. It is known in the art that loss increases monotonically with f and $B_{max}$.

Standard protocols are known for testing the core loss of soft magnetic materials {e.g. ASTM Standards A912–93 and A927(A927M-94)}. Generally they call for a sample of such materials which is situated in a substantially closed magnetic circuit, i.e. a configuration in which closed magnetic flux lines are completely contained within the volume of the sample. Such sample forms include tape-wound or punched toroids, single strips across a yoke, or stacked forms like Epstein frames. On the other hand, a magnetic material as employed in a motor component is situated in a magnetically open circuit, i.e. a configuration in which magnetic flux lines must traverse an air gap. Because of fringing field effects and non-uniformity of the field, a given material tested in an open circuit generally exhibits a higher core loss, i.e. a higher value of watts per unit mass or volume, than it would have in a closed-circuit measurement. The bulk magnetic component described herein advantageously exhibits low core loss over a wide range of flux densities and frequencies even in an open-circuit configuration.

Without being bound by any theory, it is believed that the total core loss of the low-loss bulk amorphous metal component is comprised of contributions from hysteresis losses and eddy current losses. Each of these two contributions is a function of the peak magnetic induction $B_{max}$ and of the excitation frequency f. The magnitude of each contribution is further dependent on extrinsic factors including the method of component construction and the thermomechanical history of the material used in the component. Prior art analyses of core losses in amorphous metals (see, e.g., G. E. Fish, J. Appl. Phys. 57, 3569(1985) and G. E. Fish et al., J. Appl. Phys. 64, 5370(1988)) have generally been restricted to data obtained for material in a closed magnetic circuit. The low hysteresis and eddy current losses seen in these analyses are driven in part by the high resistivities of amorphous metals.

The total core loss $L(B_{max}, f)$ per unit mass of the bulk magnetic component of the invention may be essentially defined by a function having the form $$L(B_{max},f)=c_1 f(B_{max})^n + c_2 f^q (B_{max})^m$$

wherein the coefficients $c_1$ and $c_2$ and the exponents n, m, and q must all be determined empirically, there being no known theory that precisely determines their values. Use of this formula allows the total core loss of the bulk magnetic component to be determined at any required operating induction and excitation frequency. It is generally found that in the particular geometry of a motor component such as a rotor or a stator the magnetic field therein is not spatially uniform. Techniques such as finite element modeling are known in the art to provide an estimate of the spatial and temporal variation of the peak flux density that closely approximates the flux density distribution measured in an actual bulk magnetic component. Using as input a suitable empirical formula giving the magnetic core loss of a given material under spatially uniform flux density, these techniques allow the corresponding actual core loss of a given component in its operating configuration to be predicted with reasonable accuracy.

The actual measurement of core loss may be carried out using conventional methods. Magnetomotive force is applied by passing current through a first winding encircling the magnetic component. The resulting flux density is determined by Faraday's law from the voltage induced in a second winding encircling the magnetic component to be tested. The applied magnetic field is determined by Ampere's law from the magnetomotive force. The core loss is then computed from the applied magnetic field and the resulting flux density by conventional methods, such as an electronic wattmeter.

The following examples are provided to more completely describe the properties of the component described herein. The specific techniques, conditions, materials, proportions and reported data set forth to illustrate the principles and practice of the invention are exemplary only and should not be construed as limiting the scope of the invention.

EXAMPLE 1

Preparation And Electro-Magnetic Testing of a Stamped Amorphous Metal Motor Stator $Fe_{80}B_{11}Si_9$ ferromagnetic amorphous metal ribbon, approximately 60 mm wide and 0.022 mm thick, is stamped to form individual laminations, each having the shape of an annulus 100 mm in outside diameter and 75 mm in inside diameter. Approximately 500 individual laminations are stacked and registered to form a right circular cylinder having a 12.5 mm height, a 100 mm outside diameter, and a 75 mm inside diameter, as illustrated in FIG. 3A. The cylindrical assembly is placed in a fixture and annealed in a nitrogen atmosphere. The anneal consists of: 1) heating the assembly up to 365° C.; 2) holding the temperature at approximately 365° C. for approximately 2 hours; and, 3) cooling the assembly to ambient temperature. The cylindrical assembly is removed from the fixture. The cylindrical assembly is placed in a second fixture, vacuum impregnated with an epoxy resin solution, and cured at 120° C. for approximately 4.5 hours. When fully cured, the cylindrical assembly is removed from the second fixture. The resulting epoxy bonded, amorphous metal cylindrical segment assembly weighs approximately 280 g. Primary and secondary electrical windings are fixed to the cylindrical test sample for electrical testing.

The test assembly exhibits core loss values of less than 1 watt-per-kilogram of amorphous metal material when operated at a frequency of approximately 60 Hz and at a flux density of approximately 1.4 Tesla (T), a core-loss of less than 12 watts-per-kilogram of amorphous metal material when operated at a frequency of approximately 1000 Hz and at a flux density of approximately 1.0 T, and a core-loss of less than 70 watt-per-kilogram of amorphous metal material when operated at a frequency of approximately 20,000 Hz and at a flux density of approximately 0.30 T. The low core loss of the components of the invention renders them suitable for use in constructing a motor stator.

EXAMPLE 2

High Frequency Electro-Magnetic Testing of a Stamped Amorphous Metal Motor Stator A cylindrical test sample comprising stamped amorphous metal layers is prepared as in Example 1. Primary and secondary electrical windings are fixed to the test assembly. Electrical testing is carried out at 60, 1000, 5000, and 20.000 Hz and at various flux densities. Core loss values are compiled in Tables 1, 2, 3, and 4 below. As shown in Tables 3 and 4, the core loss is particularly low at excitation frequencies of 5000 Hz or higher. Thus, the magnetic component of the invention is especially suited for use in motor stators for operation at high excitation frequency.

TABLE 1

Core Loss @ 60 Hz (W/kg)

| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron | Crystalline Fe-3% Si (275 μm) National-Arnold Magnetics Silectron |
|---|---|---|---|---|---|
| 0.3 T | 0.10 | 0.2 | 0.1 | 0.1 | 0.06 |
| 0.7 T | 0.33 | 0.9 | 0.5 | 0.4 | 0.3 |
| 0.8 T |  | 1.2 | 0.7 | 0.6 | 0.4 |
| 1.0 T |  | 1.9 | 1.0 | 0.8 | 0.6 |
| 1.1 T | 0.59 |  |  |  |  |
| 1.2 T |  | 2.6 | 1.5 | 1.1 | 0.8 |
| 1.3 T | 0.75 |  |  |  |  |
| 1.4 T | 0.85 | 3.3 | 1.9 | 1.5 | 1.1 |

TABLE 2

Core Loss @ 1,000 Hz (W/kg)

| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron | Crystalline Fe-3% Si (275 μm) National-Arnold Magnetics Silectron |
|---|---|---|---|---|---|
| 0.3 T | 1.92 | 2.4 | 2.0 | 3.4 | 5.0 |
| 0.5 T | 4.27 | 6.6 | 5.5 | 8.8 | 12 |
| 0.7 T | 6.94 | 13 | 9.0 | 18 | 24 |
| 0.9 T | 9.92 | 20 | 17 | 28 | 41 |
| 1.0 T | 11.51 | 24 | 20 | 31 | 46 |
| 1.1 T | 13.46 |  |  |  |  |
| 1.2 T | 15.77 | 33 | 28 |  |  |
| 1.3 T | 17.53 |  |  |  |  |
| 1.4 T | 19.67 | 44 | 35 |  |  |

TABLE 3

Core Loss @ 5,000 Hz (W/kg)

| | | Material | | |
|---|---|---|---|---|
| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron |
| 0.04 T | 0.25 | 0.33 | 0.33 | 1.3 |
| 0.06 T | 0.52 | 0.83 | 0.83 | 2.5 |
| 0.08 T | 0.88 | 1.4 | 1.7 | 4.4 |
| 0.10 T | 1.35 | 2.2 | 2.1 | 6.6 |
| 0.20 T | 5 | 8.8 | 8.6 | 24 |
| 0.30 T | 10 | 18.7 | 18.7 | 18 |

TABLE 4

Core Loss @ 20,000 Hz (W/kg)

| | | Material | | |
|---|---|---|---|---|
| Flux Density | Amorphous $Fe_{80}B_{11}Si_9$ (22 μm) | Crystalline Fe-3% Si (25 μm) National-Arnold Magnetics Silectron | Crystalline Fe-3% Si (50 μm) National-Arnold Magnetics Silectron | Crystalline Fe-3% Si (175 μm) National-Arnold Magnetics Silectron |
| 0.04 T | 1.8 | 2.4 | 2.8 | 16 |
| 0.06 T | 3.7 | 5.5 | 7.0 | 33 |
| 0.03 T | 6.1 | 9.9 | 12 | 53 |
| 0.10 T | 9.2 | 15 | 20 | 88 |
| 0.20 T | 35 | 57 | 82 | |
| 0.30 T | 70 | 130 | | |

TABLE 5

| Point | $B_{max}$ (Tesla) | Frequency (Hz) | Core Loss of Example 1 (W/kg) | Predicted Core Loss (W/kg) |
|---|---|---|---|---|
| 1 | 0.3 | 60 | 0.1 | 0.10 |
| 2 | 0.7 | 60 | 0.33 | 0.33 |
| 3 | 1.1 | 60 | 0.59 | 0.67 |
| 4 | 1.3 | 60 | 0.75 | 0.87 |
| 5 | 1.4 | 60 | 0.85 | 0.98 |
| 6 | 0.3 | 1000 | 1.92 | 2.04 |
| 7 | 0.5 | 1000 | 4.27 | 4.69 |
| 8 | 0.7 | 1000 | 6.94 | 8.44 |
| 9 | 0.9 | 1000 | 9.92 | 13.38 |
| 10 | 1 | 1000 | 11.51 | 16.32 |
| 11 | 1.1 | 1000 | 13.46 | 19.59 |
| 12 | 1.2 | 1000 | 15.77 | 23.19 |
| 13 | 1.3 | 1000 | 17.53 | 27.15 |
| 14 | 1.4 | 1000 | 19.67 | 31.46 |
| 15 | 0.04 | 5000 | 0.25 | 0.61 |
| 16 | 0.06 | 5000 | 0.52 | 1.07 |
| 17 | 0.08 | 5000 | 0.88 | 1.62 |
| 18 | 0.1 | 5000 | 1.35 | 2.25 |
| 19 | 0.2 | 5000 | 5 | 6.68 |
| 20 | 0.3 | 5000 | 10 | 13.28 |
| 21 | 0.04 | 20000 | 1.8 | 2.61 |
| 22 | 0.06 | 20000 | 3.7 | 4.75 |
| 23 | 0.08 | 20000 | 6.1 | 7.41 |
| 24 | 0.1 | 20000 | 9.2 | 10.59 |
| 25 | 0.2 | 20000 | 35 | 35.02 |
| 26 | 0.3 | 20000 | 70 | 75.29 |

EXAMPLE 3

High Frequency Behavior of Low-Loss Bulk Amorphous Metal Components

The core loss data of Example 2 above are analyzed using conventional non-linear regression methods. It is determined that the core loss of a low-loss bulk amorphous metal component comprised of $Fe_{80}B_{11}Si_9$ amorphous metal ribbon can be essentially defined by a function having the form $$L(B_{max}, f) = C_1 f(B_{max})^n + c_2 f^q (B_{max})^m.$$

Suitable values of the coefficients $c_1$ and $c_2$ and the exponents n, m, and q are selected to define an upper bound to the magnetic tosses of the bulk amorphous metal component. Table 5 recites the losses of the component in Example 2 and the losses predicted by the above formula, each measured in watts per kilogram. The predicted losses as a function of f (Hz) and $B_{max}$ (Tesla) are calculated using the coefficients $c_1$=0.0074 and $c_2$=0.000282 and the exponents n=1.3, m=2.4, and q=1.5. The loss of the bulk amorphous metal component of Example 2 is less than the corresponding loss predicted by the formula.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A bulk amorphous metal magnetic component for an electric machine comprising a plurality of substantially similarly shaped laminations stamped from ferromagnetic amorphous metal strips, stacked and bonded together in registry, wherein the laminations include a plurality of tooth-shaped sections.

2. A bulk amorphous metal magnetic component as recited in claim 1, wherein said component when operated at an excitation frequency "f" to a peak induction level $B_{max}$ has a core-loss less than "L" wherein L is given by the formula L=0.0074 $f(B_{max})^{1.3}$+0.000282 $f^{1.5}(B_{max})^{2.4}$, said core loss, said excitation frequency and said peak induction level being measured in watts per kilogram, hertz, and teslas, respectively.

3. A bulk amorphous metal magnetic component as recited by claim 1, each of said ferromagnetic amorphous metal strips having a composition defined essentially by the formula: $M_{70-85}$ $Y_{5-20}$ $Z_{0-20}$, subscripts in atom percent, where "M" is at least one of Fe, Ni and Co, "Y" is at least one of B, C and P, and "Z" is at least one of Si, Al and Ge; with the provisos that (i) up to 10 atom percent of component "M" can be replaced with at least one of the metallic species Ti, V, Cr, Mn, Cu, Zr, Nb, Mo, Ta, Hf, Ag, Au, Pd, Pt, and W, (ii) up to 10 atom percent of components (Y+Z) can be replaced by at least one of the non-metallic species In, Sn, Sb and Pb and (iii) up to about one (1) atom percent of the components (M+Y+Z) can be incidental impurities.

4. A bulk amorphous metal magnetic component as recited by claim 3, wherein each of said ferromagnetic amorphous metal strips has a composition containing at least 70 atom percent Fe, at least 5 atom percent B, and at least 5 atom percent Si, with the proviso that the total content of B and Si is at least 15 atom percent.

5. A bulk amorphous metal magnetic component as recited by claim 4, wherein each of said ferromagnetic amorphous metal strips has a composition defined essentially by the formula $Fe_{80}B_{11}Si_9$.

6. A bulk amorphous metal magnetic component as recited by claim 1, said component being appointed for use as a rotor.

7. A bulk amorphous metal magnetic component as recited by claim 1, said component being appointed for use as a stator.

8. A radial flux DC motor comprising:
 a) an amorphous metal stator having a plurality of substantially similarly shaped layers which are stamped from ferromagnetic amorphous metal strips and stacked and bonded together in registry, each layer including a plurality of tooth-shaped sections; and
 b) a rotor disposed for rotation within the stator.

9. A switched reluctance motor comprising:
 a) an amorphous metal stator having a plurality of substantially similarly shaped layers which are stamped from ferromagnetic amorphous metal strips and stacked and bonded together in registry, each layer including a plurality of tooth-shaped sections; and
 b) an amorphous metal rotor having a plurality of substantially similarly shaped layers which are stamped from ferromagnetic amorphous metal strips and stacked and bonded together in registry.

10. A bulk amorphous metal magnetic component for an electric machine comprising a plurality of substantially similarly shaped laminations of ferromagnetic amorphous metal, stacked and bonded together in registry, wherein the laminations include a plurality of tooth-shaped sections and said component when operated at an excitation frequency "f" to a peak induction level $B_{max}$ has a core-loss less than "L" wherein L is given by the formula $L=0.0074 f(B_{max})^{1.3}+0.000282 f^{1.5}(B_{max})^{2.4}$, said core loss, said excitation frequency and said peak induction level being measured in watts per kilogram, hertz, and teslas, respectively.

* * * * *